Sept. 6, 1927.
W. E. CORCORAN
1,641,531
DEVICE FOR SUPPORTING CONTAINERS
Original Filed Nov. 15, 1924
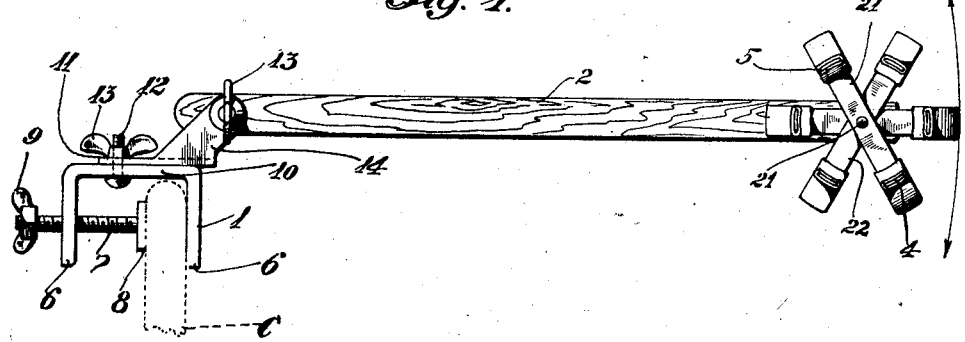
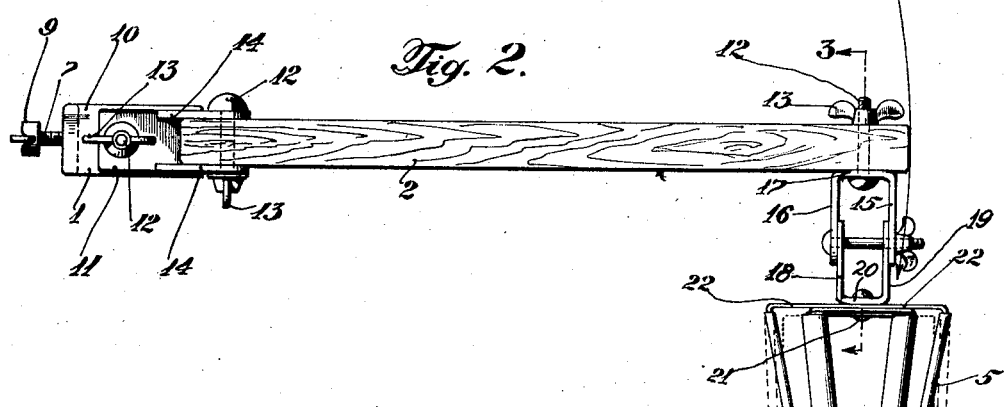
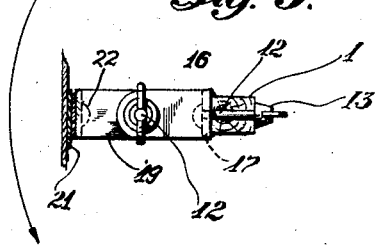
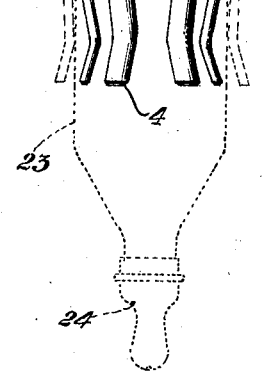
INVENTOR
WILLIAM E. CORCORAN
BY
*William F. Nickel*
ATTORNEY Patented Sept. 6, 1927.

1,641,531

UNITED STATES PATENT OFFICE.

WILLIAM E. CORCORAN, OF SOUTH PLAINFIELD, NEW JERSEY.

DEVICE FOR SUPPORTING CONTAINERS.

Application filed November 15, 1924, Serial No. 750,192. Renewed February 7, 1927.

This invention relates to improvements in devices for supporting containers; particularly adjustable holders for nursing bottles.

In the following description, with drawings accompanying the latter, the nature and objects of my invention are made clear.

On said drawings,

Figure 1 is a front view,

Figure 2 is a top view, and

Figure 3 is a sectional view on line 3—3 in Figure 2, of a bottle holder according to my invention.

The same numerals identify the same parts throughout.

My improved holder comprises a clamp 1, to which is adjustably connected one end of a bar 2, having at its opposite or free end a gripping member 3. This member includes a suitable number of strong but yieldable fingers 4, which may be covered with sleeves of rubber or some other frictional material 5. The fingers are preferably of metal, and are bent towards each other as much as is necessary to enable them to engage the outside of a nursing bottle and hold it tight enough to keep in the required position.

The clamp 1 is U-shaped, with sides 6. One side has a threaded opening through which passes a fastening bolt 7 with a disk 8 at one end between the sides 6, and a wing head 9 to enable it to be turned. This bolt secures the clamp to a support C, such as part of a chair, carriage, bassinet, or crib, by engaging the support between one side 6 and the disk 8. The arms 6 of the clamp are connected by a portion 10, to which is pivoted a plate 11 by a bolt 12, having a wing nut 13. This nut can be loosened and tightened to hold the plate in any position desired with respect to the clamp 1. One end of the plate has bent up sides 14, with alined perforations, through which and the adjacent end of the bar 2 passes another bolt 12, having another wing nut 13 to be tightened, and cause the bar 2 to be held up or down at will.

At the opposite end of the bar 2 is attached a yoke 15, with sides or arms 16 and connecting portion 17, by a similar bolt 12 and wing nut 13, the bolt passing through the bar 2 and the part 17 of the yoke. The ends of the sides 16 of this yoke are pivoted to the ends of the arms or sides 18 of a second yoke 19, by another bolt like the bolts 12, also with a wing or binding nut 13; and the portion 20 connecting the sides 18 of this yoke 19 is joined to the holding member 3 by a rivet 21. The fingers 4 of this member are all connected together in pairs by portions 22, similar to the portion 20 of the yoke 19, and thus each pair of fingers is also U-shaped or yoke-shaped; and the fingers are spaced apart by equal intervals. The yoke 19 and the yoke-shaped fingers 3 are thus secured together base-to-base.

The nursing bottle is indicated at 23, gripped around the body by the ends of the fingers 4. It has a nipple 24 over its mouth for the infant. By the bolts 12 and nuts 13, the bar 2 can be adjusted up or down and from side to side at the end attached to the clamp; while at the other end the two yokes 15 and 19 with the two bolts 12 and nuts 13 constitute a universal joint to enable the member 3 to keep the bottle 23 pointed in any direction, and inclined at any angle. The bottle is simply thrust in between the fingers 4, and pulled away from them, as the fingers grip it tightly, but readily release it.

The device holds the bottle 23 rigidly; prevents the baby throwing it down and breaking the bottle, and will keep the bottle in any position of adjustment, even if the infant moves about, or turns his head. It can be affixed to a chair, crib, carriage, bassinet or stroller, and operated with very little trouble. Preferably, the holder should be manipulated to support the bottle with the mouth downward, so that the contents fill the nipple 23, seal the drain hole in it, and keep air from entering the bottle, so that the infant cannot be made uncomfortable by taking in air when sucking out the contents. For this purpose the yoke 15 may be held in horizontal position at the end of the bar, with the yoke 19 and therefore the member 3 adjusted to be inclined forward and downward, to keep the nipple 24 below the level of the bottom of the bottle 23.

When the bottle is supported with the mouth downward, the bottle should be in inclined position only with its bottom elevated, and the mouth depressed. Such a position can be easily given to the bottle when it is gripped by the fingers 4 merely by turning down to the required extent the yoke 15 about the bolt 12 at an axis with the parts in the position shown in Figure 3.

Having described my invention, what I believe to be new and desire to secure and protect by Letters Patent of the United States is:—

A supporting device comprising a plurality of U-shaped gripping fingers, a U-shaped yoke secured base-to-base to said fingers, a second U-shaped yoke, the arms of said yokes being pivotally connected by a transverse pivot bolt, a supporting bar, a pivot bolt adjustably securing the second yoke to the end of said bar, a U-shaped clamp having a binding screw mounted in one side thereof, a plate, a pivot bolt adjustably securing the plate to the clamp, the plate having bent-up opposite sides, and a pivot bolt adjustably securing said sides to the other end of said bar.

Signed at New York, in the county of New York and State of New York, this 29th day of October A. D. 1924.

WILLIAM E. CORCORAN.